J. ZAGAR.
COLLAPSIBLE CHAIR.
APPLICATION FILED OCT. 17, 1914.
Reissued Dec. 1, 1914.
13,839.
Fig. I.
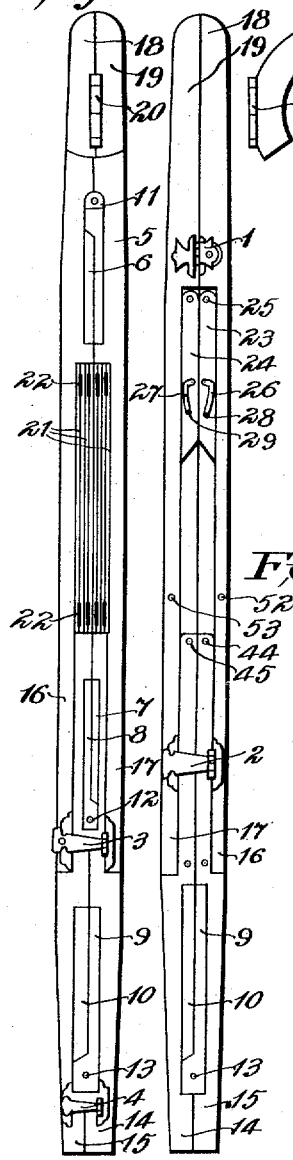
Fig. III.
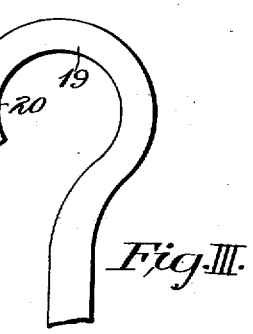
Fig. IV.
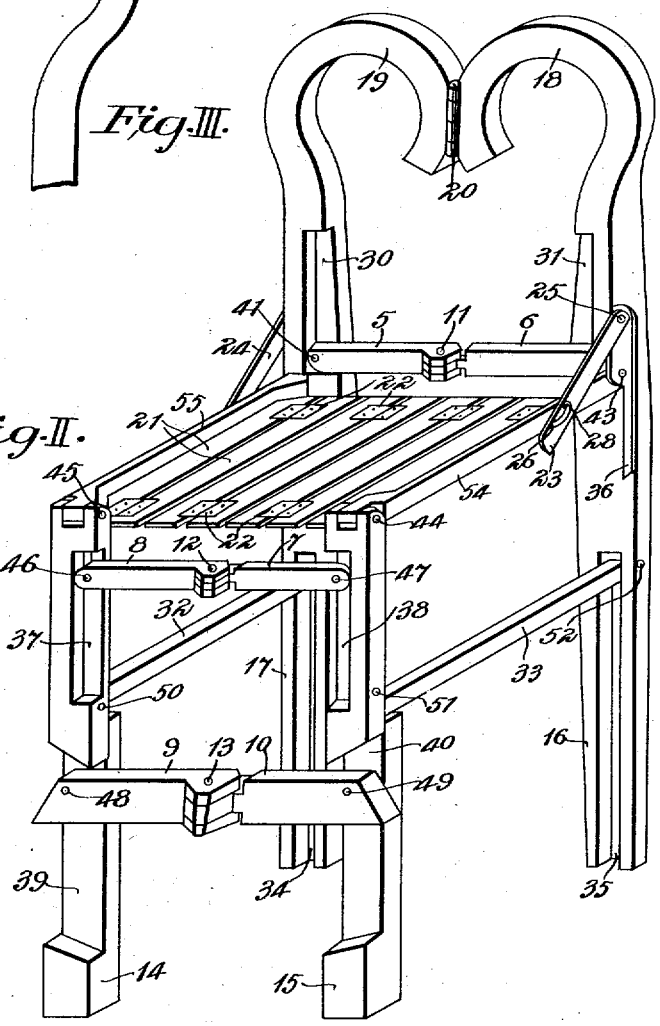
Fig. II.
Witnesses:
Mrs. D. Speck.
Miss D. Tomplin
Inventor:
John Zagar
By
W. E. Connelly
His Atty.
THE NORRIS PETERS CO., PHOTO-LITHO., WASHINGTON, D. C.

UNITED STATES PATENT OFFICE.

JOHN ZAGAR, OF CLEVELAND, OHIO.

COLLAPSIBLE CHAIR.

13,839. Specification of Reissued Letters Patent. Reissued Dec. 1, 1914.

Original No. 1,098,072, dated May 26, 1914, Serial No. 636,982. Application for reissue filed October 17, 1914. Serial No. 867,264.

*To all whom it may concern:*

Be it known that I, JOHN ZAGAR, a subject of Francis Joseph, Emperor of Austria-Hungary, residing at Cleveland, in the county of Cuyahoga and State of Ohio, have invented certain new and useful Improvements in Collapsible Chairs; and I do hereby declare the following to be a full, clear, and exact description of the invention, such as will enable others skilled in the art to which it pertains to make and use the same.

My invention relates to chairs and more especially to what is known as collapsible chairs.

The invention further relates to the novel construction and assemblage of parts which form the chair as a whole.

The object of my invention is to produce a chair which may be folded into a small space and when thus folded to take the appearance and usefulness of a cane or walking stick.

Another object of the invention is to produce a chair which, when unfolded and in position to be used, will be solid and impossible to accidental folding.

The invention consists in the parts and combination of parts and the manner of connecting and folding the same so as to have all parts fit together forming the shape of a cane or walking stick and being adapted to be unfolded and form a chair without detaching or attaching any of the parts.

In the drawings, I have shown in Figure I, a front elevation view of the chair as it looks when folded into the form of a cane. Fig. II, is a view in rear elevation of the chair in the same position as shown in Fig. I. Fig. III, illustrates the handle of the cane or walking stick and the manner of hinging it. Fig. IV, is an isometric view of the chair in its normal position and showing the several parts as they are positioned when the chair is in this condition.

In constructing this device I prefer to form the same of wood or pressed sheet metal. The structure as a whole, when in its folded position, is flat. The rear legs 16 and 17 and the back portions 18 and 19 together are formed of two pieces hinged together at their upper ends by hinge 20 and midway between the top and bottom of these portions I form a hinged brace made of two pieces 5 and 6 hinged together as at 11 and pivotally connected to the back portions 18 and 19 as at 41. Just below the brace pieces 5 and 6 and pivotally connected to the legs 17 and 17 as at 43 I provide the seat frame 54 and 55. To the opposite ends of this seat frame I pivotally connect the front legs 14 and 15 as at 44 and 45. In order to hold the front legs in proper alinement with the rear legs I provide a brace rod on each side of the chair. These brace rods 32 and 33 are pivotally connected to the front and rear legs as shown at 50, 51 and 52. I have found it necessary to provide braces for the front legs 14 and 15 in order to keep them properly separated hence I form a hinged brace made of pieces 7 and 8 hinged together as at 12: This brace is pivotally attached to the front legs 14 and 15 as at 46 and 47. Below this brace I have formed a like brace made of two pieces 9 and 10, hinged together as at 13 and pivotally connected to the front legs 14 and 15 as at 48 and 49. With the legs all properly braced and spaced apart it is now necessary to provide a brace for retaining the chair in position and keeping it from collapsing and for this purpose I provide braces 23 and 24 pivotally attached to the back pieces 18 and 19 as at 25. These braces are each provided with a slot 26 which is curved as shown in Fig. II. This slot engages a pin 28 in the seat frame 54. When the chair is in the position shown in Fig. IV the braces 23 and 24 are dropped on their respective pins 28 and the chair is retained in position until the braces are displaced from the pins 28. For the purpose of illustration I have shown the seat as being composed of a series of slats 21, 21, hinged together as at 22, 22, this however may be substituted by cloth or any other suitable flexible material such as cane.

The peculiar shape of the several parts will be noticed in the drawings. These shapes are necessary on account of providing places for the reception of the various braces and like parts which are folded within and upon each other. In order to describe the use of the several recesses I will set forth the operation of this invention.

Taking this device as shown in Figs. I, and II, as being a cane I will describe the operations necessary to convert the same into the chair as shown in Fig. IV. The clamps 1, 2, 3, and 4, are unfastened after which the parts 5 and 6, hinged together as at 11, also hinged to the cane as at 41, (only one side visible in Fig. IV) are pulled outwardly and downwardly to a horizontal position. The parts 7, and 8, hinged in like manner to the cane as at 46, and 47, and hinged together as at 12, are then pulled outwardly and upwardly to a horizontal position. The parts 9 and 10, hinged together as at 13, and hinged to the cane as at 48 and 49 are then pulled outwardly and upwardly to a horizontal position, thus having all three of these pair of sections pointing in the same direction and at the same angle. The cane being in this position the parts 18, 16 and 15 are swung apart from the parts 19, 17, and 14; these parts being swung on hinge 20, and the pivotal connections 11, 12, and 13. After these above mentioned parts 15, 16 and 18 are swung apart from the parts 14, 17 and 19, the cane has been converted into a flat mass which is neither a cane or a chair condition.

When the parts are swung apart as above described the seat of the chair which is formed of sections 21, 21, 21, 21, hinged together as shown by hinges 22, 22, is unfolded and lies between the seat frame 54 and 55, in an extended condition. The cane having been thus far converted into a chair the next operation is to bring the parts 16 and 17 outward and downward and at the same time bringing the parts 14 and 15 outward and upward. When this operation takes place the rungs or braces 32 and 33 being hinged as at 51 and 52 to the parts 15 and 16 and hinged as at 50 to part 14 (the hinged part to part 17 being hidden cannot be shown) are brought along with the parts 14, 15, 16, and 17, which now serve the purpose of and may be termed legs. In like manner the frame 54 and 55 of the seat is brought to a horizontal position through the above mentioned operation, the frame being hinged to the leg 15 as at 44, to the leg 14, as at 45 and to the leg 16 as at 43, (the hinged portion on leg 17 being hidden cannot be shown). At the same time the above mentioned operation takes place the braces 23 and 24, which are pivoted as at 25 to the back legs 16 and 17 respectively, are brought to a diagonal position and the peculiarly shaped slots 26 and 27 of the braces 23 and 24 allow the braces to assume the position as shown in Fig. IV, and to retain them in that position until they are raised out of position by manual manipulation.

The chair now being in a position ready for use I will describe the method of reforming it into the cane formation, which is as follows: The braces 23, and 24 are raised out of their catch position from the pins 28, one on each side, and by raising the back 18, and 19, allowing the front legs 14 and 15 and the seat frame 54 and 55 together with the seat portions 21, 21, 21, 21, to collapse and at the same time bringing the cross braces or rungs 32 and 33 into the recesses 34 and 35 respectively. The braces 23 and 24 are brought into the recesses 36, one on each side, thus making the chair form a flat mass. The chair being in this position the parts 18, 16 and 15 are folded toward the parts 19, 17 and 14, and the seat portions 21, 21, 21, 21, are folded upon each other and take their place between the seat frame 54 and 55. After this last folding operation has taken place the portions 5 and 6 are folded upward and inward into the recesses 30 and 31; the parts 7 and 8, are then folded downward and inward into the recesses 37 and 38 and the parts 9 and 10 are folded downward and inwardly into the recesses 39 and 40. All of the above having been accomplished the clasps 1, 2, 3, and 4, are then fastened and the chair has been again converted into a cane.

From the above description it will be noticed that the chair may be folded into a cane but where this is not desirable my invention proves of value inasmuch as the chair, after having the front legs 14 and 15 together with the seat 21, 21, 21, and the seat frame 54 and 55 folded flat with the back 18 and 19 and the rear legs 16 and 17, may be left in this condition and a great number of these chairs may be packed in a very small space. A chair of this nature would be useful to funeral directors or others who find it necessary to transport a large quantity of chairs from one place to another as the space when packed is small and when the chair is in its normal condition or position it is not possible for it to collapse without first releasing the side braces.

From the above description taken in connection with the drawings it will be seen that I have constructed a chair which may be folded either flat or into a shape of a cane as desired, and that the chair is solid, while when in the form of a cane all the parts are folded together tightly and while there are no hollow parts to the cane the appearance of the cane is neat and the cane is useful.

While I have shown and described this invention as at the present time I find it best adapted I do not hence wish to be limited to the exact details of construction as the same may be greatly modified and still the objects of my invention be attained.

What I claim is:

A collapsible chair of the type set forth comprising rear legs and back composed of two members hinged together, a seat pivotally attached to said rear legs, front legs pivotally attached to said seat, recesses located in the front legs, rear legs and back, said seat adapted to be folded downwardly into the plane of the rear legs and back, brace rods located between the front legs and brace rods located between the rear legs, said rods being hinged vertically to the legs and provided with a horizontal hinged joint midway between said legs, said horizontal hinged joint allowing the rear legs, front legs and back to be folded together and the vertical hinged connections allowing said brace rods to be folded into the said recesses after the rear legs, front legs and back are folded together, all substantially as and for the purpose set forth.

Signed at Cleveland in the county of Cuyahoga and State of Ohio this 19th day of May, 1911.

JOHN $\overset{\text{his}}{\underset{\text{mark.}}{\times}}$ ZAGAR.

Witnesses:

JOHN J. DONNELLY,
GUSTAV OBLAK.

Copies of this patent may be obtained for five cents each, by addressing the "Commissioner of Patents, Washington, D. C."